Dec. 26, 1961   J. G. FISHER   3,014,292
SCRAPERS
Filed May 15, 1959   3 Sheets-Sheet 1
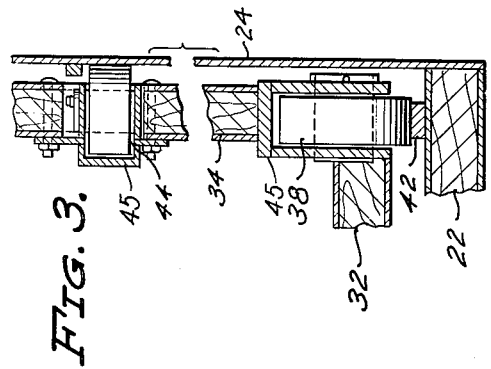
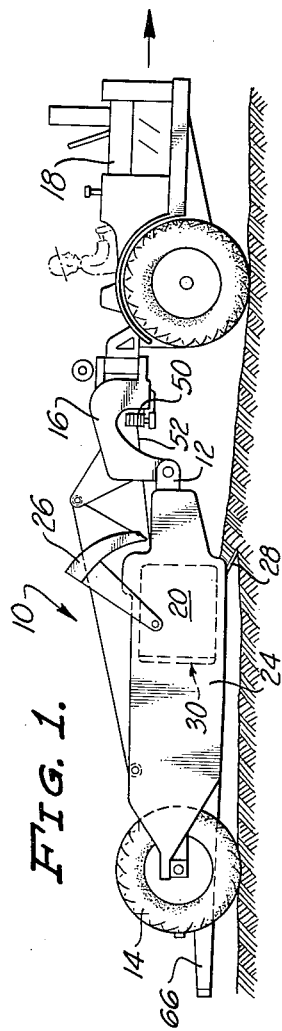
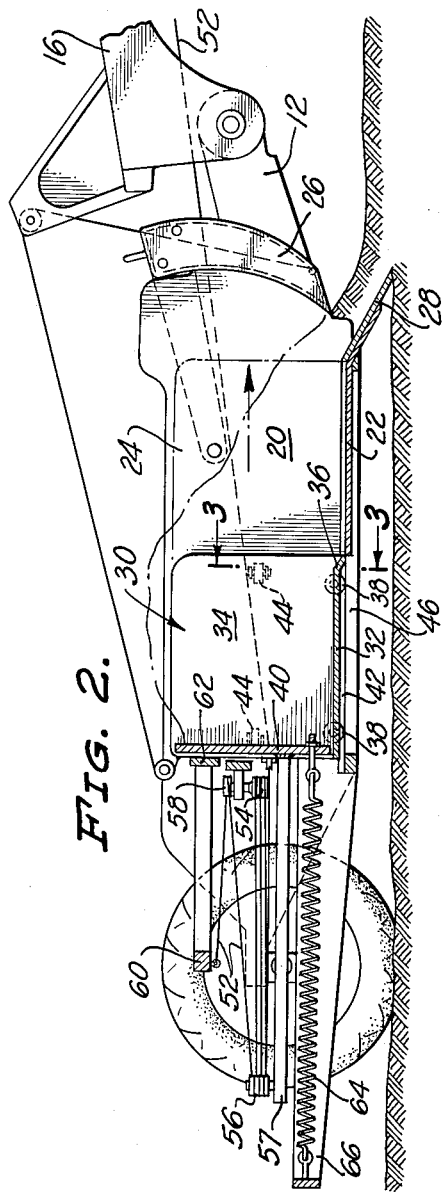
INVENTOR.
JOHN G. FISHER
BY
ATTORNEY Dec. 26, 1961  J. G. FISHER  3,014,292
SCRAPERS
Filed May 15, 1959
3 Sheets-Sheet 2
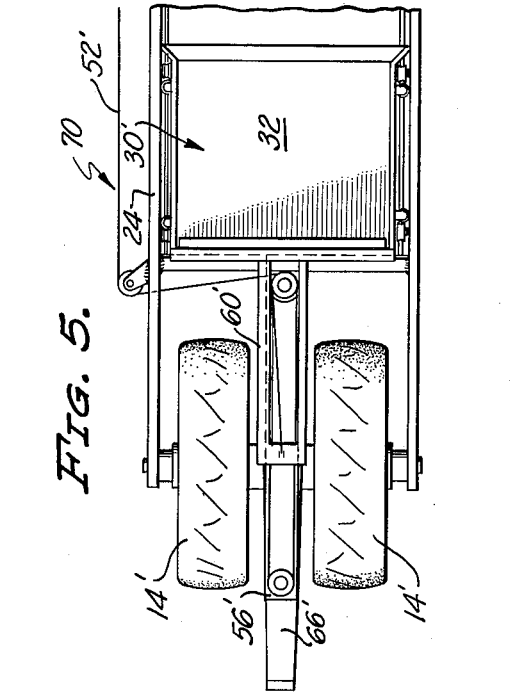
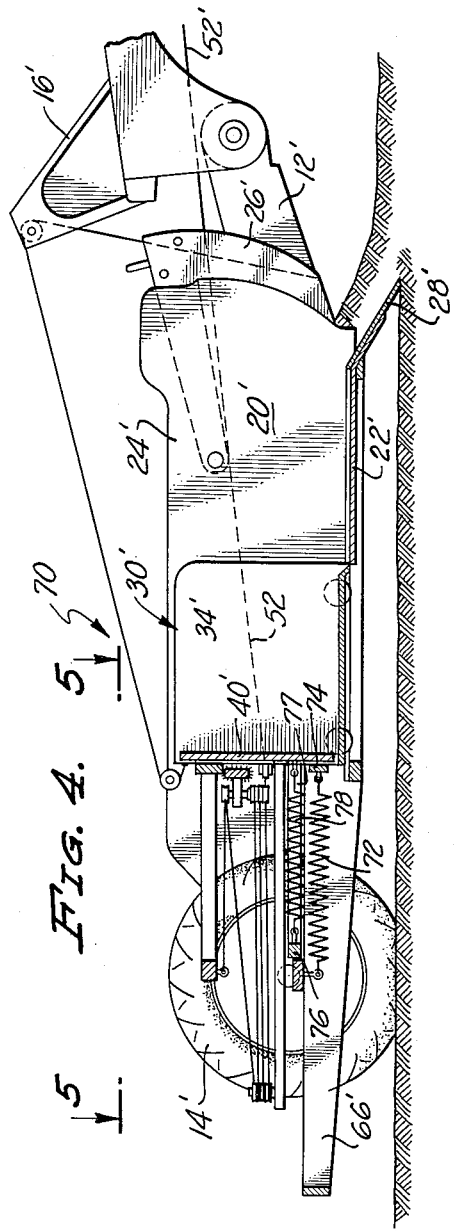
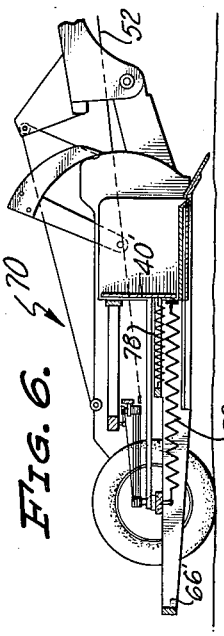
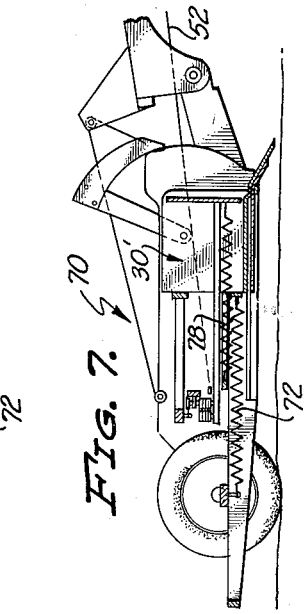
INVENTOR.
JOHN G. FISHER
BY
Fred D. O'Brien
ATTORNEY Dec. 26, 1961    J. G. FISHER    3,014,292
SCRAPERS
Filed May 15, 1959    3 Sheets-Sheet 3
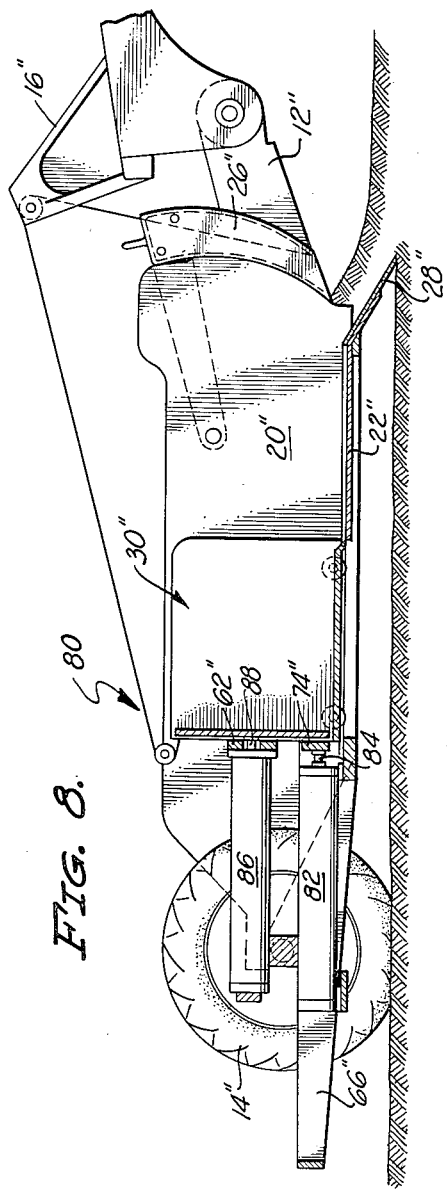
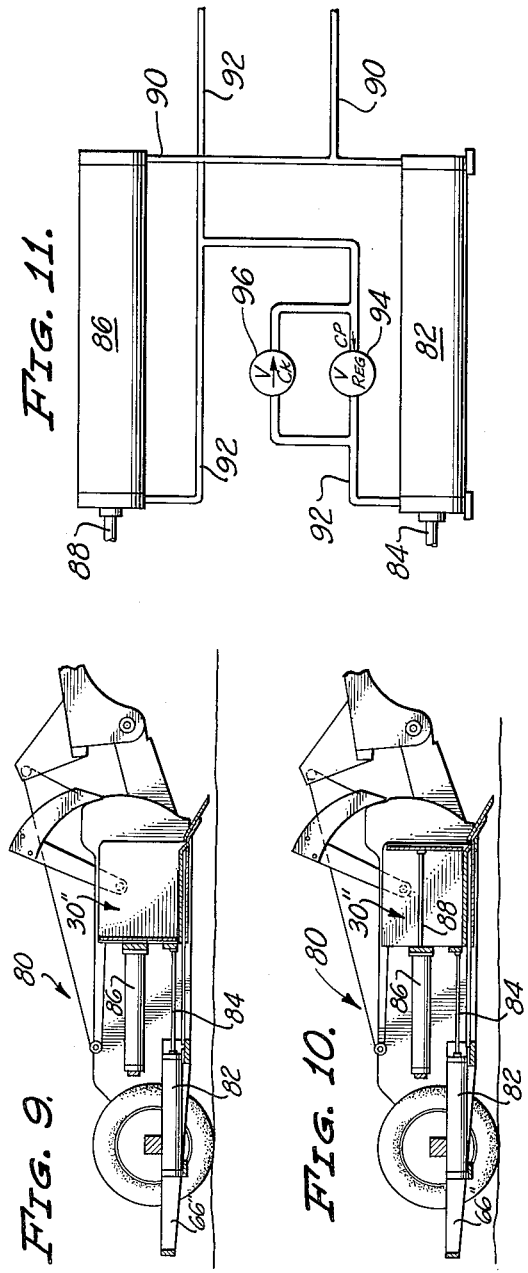
INVENTOR.
JOHN G. FISHER
BY
Edw D. O'Brien
ATTORNEY

United States Patent Office 3,014,292
Patented Dec. 26, 1961

3,014,292
SCRAPERS
John G. Fisher, 1239 Lamer St., Burbank, Calif.
Filed May 15, 1959, Ser. No. 813,412
4 Claims. (Cl. 37—129)

This invention pertains to new and improved scrapers. The term "scrapers" used in this specification is employed to designate machines of a type commonly used to pick up dirt or the like from one location and transport this material to another location.

Common "scrapers" as the term is broadly used consist of a tractor which is employed to pull a scraper as the term is more specifically employed in common practice, and a scraper. Such a scraper normally consists of a frame having front and rear ends between which ends there is supported a bowl. In the scraper proper supporting wheels are provided at the rear of the frame and a yoke adapted to be pivotally carried upon a tractor in supporting the scraper is provided at the front end of the frame.

Scrapers of the type briefly indicated in the preceding paragraph are well known at the present time, and are very widely used for the purpose intended. These present scrapers suffer from a difficulty limiting their economic utility. This difficulty is directly related to the fact that a tractor of a given power rating can only load and unload a given amount of dirt or the like into a presently constructed scraper, while such a tractor is capable of pulling a scraper containing a greater amount of material from one location to another. Such scrapers, and the control means used to unload them are not constructed in such a manner that the total amount of dirt or other material which a tractor of a given power rating can transport in them can be satisfactorily unloaded from them.

As a result of these factors the economics of the operation of presently known scrapers are not as favorable as desired. In the business of moving soil, sand and the like the total cost of moving a given quantity of such material from one location to another is extremely important. Hence, there is a definite need for improved scrapers which can be used with tractors of a given power rating so that the quantity of material capable of being transported by such a tractor corresponds to the quantity of material which can be loaded and unloaded into such a scraper. In other words, there is a need for improving known scrapers so as to improve their capacity in order to improve the economics of the use of such scrapers.

A broad general object of this invention is to provide new and improved scrapers. A related general object of this invention is to provide scrapers which are much more economically advantageous than prior related scrapers. Another object of this invention is to provide means for modifying existing types of scrapers so as to approximately double their carrying capacity. A further object of this invention is to provide scrapers of such increased carrying capacity which can be operated using the same general type of operating or control means presently employed on existing scrapers.

Because of the nature of this invention it is not considered necessary to specifically set forth further objects of this invention in this specification. The above and other objects and advantages of this invention will be fully apparent to those skilled in the field of earth moving apparatus from a detailed consideration of the remainder of this description, the appended claims and the accompanying drawings in which:

FIG. 1 is a side elevational view of a tractor and an attached scraper of this invention;

FIG. 2 is a cross-sectional view of the scraper shown in FIG. 1;

FIG. 3 is a partial cross-sectional view taken at line 3—3 of FIG. 2;

FIG. 4 is a cross-sectional view similar to FIG. 2 of a modified scraper of this invention;

FIG. 5 is a partial top plan view of this modified scraper taken in the direction of line 5—5 in FIG. 4;

FIGS. 6 and 7 are views similar to FIG. 4 showing the positions of various parts of this modified scraper during its use;

FIG. 8 is a cross-sectional view similar to FIG. 2 of a further modified scraper of this invention;

FIGS. 9 and 10 are views similar to FIG. 8 showing the positions of various parts of the scraper illustrated in FIG. 8 during the use of this scraper; and FIG. 11 is a schematic view showing how various parts employed in the scraper shown in FIG. 8 are connected together.

Whenever convenient for purposes of illustration and explanation like numerals are used to designate like parts in the various scrapers shown in the drawings. It is to be understood that these drawings are primarily intended to illustrate certain presently preferred forms or embodiments of this invention. The invention itself is not to be taken as being limited by these drawings since those skilled in the art can provide other differently appearing scrapers using the features of this invention explained in this specification through the exercise of routine engineering skill.

As an aid to understanding of this invention it can be stated in essentially summary form that it involves scrapers, each of which includes a frame having front and rear ends to which there are attached in conventional manner wheels and a yoke used in supporting the complete scraper. This frame carries what is commonly referred to as a bowl having an open end adjacent to the front end of the frame. A blade is located at the bottom of this bowl so that during the operation of the scraper dirt or the like may be picked up and conveyed over the blade into the interior of the bowl proper. With the present invention such a bowl includes a bottom wall connecting opposed side walls, and in addition a truck which is movably mounted in the bowl so as to be capable of being moved from adjacent to the rear end of the bowl to adjacent to the front of the bowl. This truck has side and bottom walls which are substantially contiguous to the corresponding walls of the bowl proper. It also has a back wall or ejector which is movably mounted on the truck so as to be capable of being moved to the front of the truck during the use of this scraper.

The actual nature of this invention will be more fully apparent by referring directly to the accompanying drawings. In FIGS. 1, 2 and 3 there is shown a scraper 10 of the present invention which includes a conventional frame 12 carrying at its rear end wheels 14 used in supporting this end of the scraper 10 and a conventional yoke 16 at the front end of the frame 12. This yoke 16 is connected in an established manner to a tractor 18 used in propelling the scraper 10. If desired, both the scraper 10 and the tractor 18 can be referred to as a complete scraper.

The frame 12 carries a bowl 20 in the nature of a receptacle or bin having a bottom wall 22 and parallel opposed side walls 24. A conventionally constructed and operated gate or apron 26 is pivotally mounted on the frame 12 so that during the operation of the scraper 10 it can be raised or lowered so as to cover or uncover the front end of the bowl 20. The bottom wall 22 of this bowl 20 is provided with a conventional blade 28 directly beneath the gate 26, which blade is used in digging up and conveying dirt or the like into the interior of the bowl 20 during the use of the scraper 10.

When this scraper 10 is first used, such material conveyed into the bowl 20 past the blade 28 is conveyed into a truck 30 which is movably mounted generally within the bowl 20. This truck 30 includes a bottom wall 32 positioned so as to be spaced closely adjacent to the bottom wall 22 and side walls 34 which are correspondingly spaced with respect to the side walls 24. Preferably the walls 32 and 34 are provided with tapered front edges 36 which serve to effectively prevent dirt from entering between them and the walls 22 and 24. The truck 30 also includes a back wall or ejector plate 40 which is movably positioned at the end of this truck adjacent to the rear of the frame 12, but which is capable of being moved to the end of the truck 30 adjacent to the front end of the frame 12.

As the scraper 10 is pulled in a forward direction and dirt is conveyed into the truck 30 as indicated, this truck will gradually be filled with such material. After the truck 30 becomes filled and other parts of the scraper 10 as hereinafter described are operated, it will roll toward the rear of the scraper and the bowl 20 upon bottom wheels 38 mounted at the sides of it so as to ride upon rails 42 extending the length of the bowl 20. Motion of the truck 30 toward either of the side walls 24 of the bowl 20 is prevented by means of other wheels 44 mounted upon the side walls 34 so as to bear against the side walls 24. Preferably the wheels 38 and 44 are mounted upon yokes 45 located within the walls 34 as shown in FIG. 3 so that the truck 30 fits closely within the bowl 20. Such a close fit provides for the maximum capacity of both the bowl 20 and the truck 30. An opening 46 in the bottom wall 22 of the bowl 20 adjacent to the rear end of the frame 12 prevents such motion of the truck 30 from being impeded by means of an undesired build up of dirt or the like accumulating generally beneath the bottom wall 32 of the truck 30.

When the truck 30 has moved toward the rear of the scraper 10 in this manner, and the scraper 10 is operated further, further dirt and the like will be picked up by the blade 28 so as to cause an accumulation of material directly within the bowl 20 itself. After both the truck 30 and the bowl 20 have been filled the gate 26 may be closed in a conventional manner, and the scraper 10 moved in accordance with established practice so that the material carried by the scraper 10 may be transported to another location.

In such another location this material can be ejected from the bowl 20 and the truck 30 by operating a conventional power drum 50 upon the tractor 18 so as to pull upon a cable 52. This cable passes around a series of pulleys 54 mounted upon the frame 12 and upon another series of pulleys 56 mounted on a ram 57 attached to the ejector plate 40 so as to extend therefrom, and thence around a further pulley 58 mounted upon the frame 12, and terminates where it is attached to the end of a truck ram 60 attached directly to the side walls 34 of the truck 30 by a cross brace 62. This ram 60 is preferably of such a length that the truck 30 may be moved toward the front of the bowl 20 without moving the truck 30 off of the bowl 20. In order to accomplish this result the maximum distance between where the cable 52 is attached to the ram 60 and the pulley 58, shown in FIG. 2 of the drawings, corresponds to this amount of travel. Preferably the maximum distance between the pulleys 54 and 56 also corresponds to the amount the ejector plate 40 can travel within the truck 30, that is, the length of the bowl 20.

The ejector plate 40 is normally held against the cross brace 62 at the back of the truck 30 by means of a coil spring 64; as it is best seen in FIG. 2 of the drawing one end of this coil spring 64 is secured directly to the ejector plate 40, and the other end of it is secured to an end of a box-like brace 66 extending from the frame 12 between the wheels 14.

As tension is applied to the cable 52 through the operation of the drum 50 when material is within the bowl 20 and the truck 30 is in the position shown in FIG. 1, this truck 30 will initially be moved toward the front end of the scraper 12 so as to push material out past the gate 26 after this gate has been opened in a conventional manner. The truck 30 will move in this manner before the ejector plate 40 moves because it is mounted on the wheels 38, and, hence, less force is required to move it than is required to move the plate 40. It also moves in this manner since the cable 52 is attached so that more power is available to move the truck 30 than is available to move the ejector plate 40. With the arrangement of the cable 52 shown what may be referred to as "more lines of power," in other words, more force is available to push both the truck 30 and the ejector plate 40 forward simultaneously at the start of a dumping operation when a maximum amount of power is needed to move the material within the bowl 20 than is available to push the ejector plate 40 alone. After the material in the bowl 20 ahead of the truck 30 is removed from the bowl in this manner further tension on the cable 52 causes the ejector plate 40 to move to the front of the truck 30 adjacent to the gate 26, resulting in material within the truck 30 to be similarly deposited upon the ground over which the scraper 10 is being moved.

With the arrangement of the cable 52 shown less force is used to move the ejector plate 40 than is employed in the preceding stage of this unloading operation. Also this ejector plate 40 as a result of the usage of the cable 52 shown will move more rapidly than the truck 30 and the ejector plate 40 move together during the preceding stage of the unloading operation. This causes a more uniform amount of material to be spread upon the ground during this latter part of the unloading operation since the bowl 20 is not nearly as full at this time, as when the unloading operation is started.

At the end of this operation tension upon the cable 52 may be partially released through the operation of the power drum 50 so as to permit the ejector plate 40 to travel to the back of the truck 30. Such travel is, of course, caused by the spring 64. The cable 52 is released only to such a point the ejector plate 40 is moved without the truck 30 moving. At this point the complete scraper 10 is ready to be used again. As it is used the material entering into the bowl 20 past the plate 28 and the tension from the spring 64 will tend to return the truck 30 to its position at the rear of the bowl 20, after this truck has been filled and after tension on the cable 52 has been released to a sufficient extent to permit such movement of the truck 30.

In order to avoid the use of a single spring such as the spring 64 governing the movement of both the truck 30 and the ejector plate 40 it is possible to provide a modified scraper 70 as indicated in FIGS. 4 through 7 of the drawings. Since this modified scraper is substantially identical to the scraper 10 all of the corresponding parts of it are designed by the primes of the numerals previously used and are not separately described in this specification.

In the modified scraper 70 a coil spring 72 is mounted so as one end of it is secured within the brace 66' and so that the other end of it is attached directly to a cross-bar 74 extending between the side walls 34' of a truck 30'. With this construction a small arm 76 is mounted upon an arm 77 extending from the back of the truck 30', and another spring 78 is connected between the arm 76 and the back of the ejector plate 40' as shown. This arm 77 is connected to the side walls 34' of the truck 30'.

With this construction during the use of the scraper 70 when the cable 52' is pulled initially only the spring 72 will be stretched when the truck 30' is moved toward the front of the bowl 20' as indicated in FIG. 6 of the drawing. As further tension is applied to the cable 52 the other spring 78 will be placed under tension as the ejector plate 40' is moved toward the front of the truck 30' and the bowl 20'. Thus, with the scraper 70 the "overworking" of a single spring is avoided and more uniform forces are employed in moving the truck 30' and the ejector plate 40' to the back of the scraper 70 than are employed with the scraper 10 which uses only the single spring 64 for this purpose.

Many scrapers at the present time are used with tractors which are equipped to provide hydraulic power. A scraper 80 of this invention adapted to be used with such a source of hydraulic power is indicated in FIGS. 8 through 10 of the drawings. Since practically all of this scraper 80 is identical with the scrapers 10 and 70 those parts of the scraper 80 which correspond to parts of the scrapers 10 and 70 are not separately described, and are designated by the double primes of the numerals previously used.

In the scraper 80 a hydraulic cylinder 82 is mounted upon the brace 66". A piston rod or ram 84 extends from the cylinder 82 so as to connect with the cross bar 74" extending between the side walls 34" of the truck 30". Another hydraulic cylinder 86 is mounted upon the ram 60" extending from the base 62" extending between the side walls 34" of the truck 30". This cylinder 86 carries a piston rod or ram 88 attached directly to the back of the ejector plate 40".

These cylinders 82 are connected together by means of hydraulic lines as indicated in FIG. 11 of the drawing so that the rear ends of the cylinders 82 and 86 are connected in parallel by means of a line 90 leading to a hydraulic power unit (not shown) on the tractor 18". Another line 92 connected to the same hydraulic power unit leads directly to the other end of the hydraulic cylinder 86 and leads through a pressure responsive valve 94 to the other end of the hydraulic cylinder 82. A bypass check valve 96 extending around the valve 94 is provided in the line 92 for return of hydraulic fluid through this line 92 as herein described.

During the use of this scraper 80 when hydraulic fluid is supplied to the cylinders 82 and 86 through the line 90 by virtue of the differential in ease by which the truck 30" and the ejector plate 40" can move the cylinder 82 will be initially actuated so as to move the truck 30" toward the front of the scraper 80 to the position indicated in FIG. 9 of the drawing. Next, the hydraulic cylinder 86 will be actuated so as to move the ejector plate to the position as indicated in FIG. 10 of the drawings. Simultaneously hydraulic fluid will be removed from the other ends of the hydraulic cylinders 82 and 86 through the line 92 and through the check valve 96.

When it is desired to return the truck 30" and the ejector plate 40" to the initial position shown in FIG. 8 of the drawing hydraulic fluid under pressure is supplied through the line 92 to the cylinder 86. The valve 94, being responsive to pressure, will remain closed during this operation until such time as the ejector ram 88 is returned to the position shown in FIG. 9 of the drawings. Then because of the pressure increase this valve 94 will open, drawing the entire truck 30" back to the position shown in FIG. 8.

From an examination of the various embodiments of the invention shown in the drawings, it is to be noted that in each of them the truck used is designed so as to hold approximately half of the total amount of material which is intended to be conveyed or carried in the corresponding scraper. Further, the trucks illustrated are designed in such a manner that earth or the like may be easily and conveniently moved from one end of the bowl in any one of these scrapers to the other end of the bowl with a minimum amount of difficulty. The structures of this invention are quite advantageous economically since they can be used to carry more material than prior related devices in which the entire weight of material within a bowl had to be moved along the surface of the bowl without the use of any means such as the trucks herein described. This fact severely limited the capacity of the prior related scrapers.

Those skilled in the art to which this invention pertains will realize that by appropriate modification of existing scrapers that these structures may be modified with a comparatively nominal amount of difficulty and expense so as to incorporate the features of this invention. Because of the nature of this invention it is to be considered as being limited only by the appended claims forming a part of this disclosure. This application is a continuation-in-part of the co-pending application Serial No. 759,615 filed September 8, 1958, now abandoned, entitled, Surface Leveling Machine, the disclosure of which copending application is incorporated herein by reference.

I claim:

1. In a scraper for use in moving dirt, said scraper including a frame having front and rear ends, wheels mounted on the rear end of said frame, yoke means for use in securing said frame to a tractor means mounted on the front end of said frame, bowl means mounted on said frame between the ends thereof, said bowl means having a front end adjacent to the front end of said frame and rear end adjacent to the rear end of said frame, said bowl means having a fixed bottom extending approximately one half of the length of said bowl means from the front end of said bowl means, gate means for closing said front end of said bowl means mounted on said bowl means, blade means attached to the bottom of said bowl means so as to extend from said front end of said bowl means, the improvement which comprises in combination: truck means fitting closely within the interior of said bowl means and extending approximately one-half the length of said bowl means; wheel means secured to said truck means and supporting said truck means on said bowl means so that said truck means is capable of being moved between the front and rear ends of said bowl means; ejector plate means mounted on the end of said truck means adjacent to the rear end of said bowl means, said ejector plate means being capable of being moved between the ends of said truck means; means for moving said truck means from adjacent to said rear end of said bowl means to adjacent to said front end of said bowl means, said means for moving said truck means contacting the rear end of said truck means; and means for separately moving said gate means from adjacent to said rear end of said truck means to adjacent to said front end of said truck means when said truck means has been moved adjacent to said front end of said bowl means, said means for moving said gate means engaging the center portion of said gate means.

2. A scraper as defined in claim 1 wherein said means for moving said truck means comprises a single hydraulic cylinder connecting said rear end of said frame with said rear end of said truck means and wherein said means for moving said ejector plate means comprises a single hydraulic cylinder mounted on the rear end of said truck means and connecting said truck means and said ejector plate means.

3. A scraper as defined in claim 2 wherein said hydraulic cylinders are connected in parallel.

4. A scraper as defined in claim 1, including a cable, and wherein said means for moving said truck means and said means for moving said gate means both utilize said cable and both include pulley means, part of said pulley means being mounted on said rear end of said bowl and part of said pulley means being mounted on said rear end of said truck means, said cable passing around said pulley means so as to be capable of providing power for moving said truck means from adjacent to the rear of said bowl means to adjacent to the front of said bowl means, said cable being secured to the rear of said ejector plate means after passing around both of said pulley means, and including spring means connecting the rear end of said truck means and the rear end of said frame and including other spring means connecting the rear of said ejector plate means with the rear end of said truck means, said spring means being capable of returning said truck means and said ejector plate means to the rear of said bowl means.

References Cited in the file of this patent
UNITED STATES PATENTS

| | | |
|---|---|---|
| 2,112,105 | Le Tourneau | Mar. 22, 1938 |
| 2,179,532 | Walch | Nov. 14, 1939 |
| 2,383,978 | Le Tourneau | Sept. 4, 1945 |